United States Patent
Capelo et al.

(10) Patent No.: US 11,367,021 B2
(45) Date of Patent: Jun. 21, 2022

(54) SYSTEM AND METHOD FOR HETEROGENEOUS MODEL COMPOSITION

(71) Applicant: Grid.ai, Inc., New York, NY (US)

(72) Inventors: Luis Capelo, New York, NY (US); Richard Izzo, New York, NY (US)

(73) Assignee: Grid.ai, Inc., New York, NY (US)

( * ) Notice: Subject to any disclaimer, the term of this patent is extended or adjusted under 35 U.S.C. 154(b) by 0 days.

(21) Appl. No.: 17/494,296

(22) Filed: Oct. 5, 2021

(65) Prior Publication Data

US 2022/0108223 A1    Apr. 7, 2022

Related U.S. Application Data

(60) Provisional application No. 63/212,757, filed on Jun. 21, 2021, provisional application No. 63/087,391, filed on Oct. 5, 2020.

(51) Int. Cl.
    *G06N 20/00* (2019.01)
(52) U.S. Cl.
    CPC .................. *G06N 20/00* (2019.01)
(58) Field of Classification Search
    CPC ...................................................... G06N 20/00
    See application file for complete search history.

(56) References Cited

U.S. PATENT DOCUMENTS

| | | |
|---|---|---|
| 2017/0006135 A1 | 1/2017 | Siebel et al. |
| 2017/0154425 A1 | 6/2017 | Pierce et al. |
| 2020/0160229 A1* | 5/2020 | Atcheson ................. G06N 5/02 |
| 2020/0193221 A1 | 6/2020 | Aftab et al. |
| 2020/0234120 A1* | 7/2020 | Matsuo .................... G06N 3/08 |
| 2021/0192282 A1* | 6/2021 | Goodsitt ................ G06N 20/20 |
| 2021/0271986 A1* | 9/2021 | Hu ....................... G06F 11/3612 |
| 2021/0279644 A1* | 9/2021 | Givental .............. G06K 9/6215 |

OTHER PUBLICATIONS

Chari, K., "Enterprise-wise Decision Support Systems: An Intelligent Approach", /University of South Florida, Information System/Decision Sciences. Jul. 1999 (retrieved on Dec. 4, 2021)., p. 3, para 2-3, p. 4, para 2, p. 9, para 3, p. 10, para 2, p. 30, para 5—p. 31, para 1, Fig. 1, 3.

Stevens, E., et al., "Deep Learning With PyTorch", Manning Publications. Jun. 15, 2020. (retrieved on Dec. 3, 2021). Retrieved from the internet: <http://pytorch.org/assets/deep-learning/Deep-Learning-with-PyTorch.pdf>, entire document, especially p. 10, para 6.

\* cited by examiner

*Primary Examiner* — Dave Misir

(74) *Attorney, Agent, or Firm* — Jeffrey Schox; Diana Lin

(57) ABSTRACT

A method for standardized model interaction can include: determining a model composition, receiving an input, converting the input into a standard object, converting the standard input object into a model-specific input (MSI) object, executing the model using the MSI object, converting the output from the model-specific output (MSO) object to a standard object, repeating previous steps for each successive model within the model composition, and providing a final model output.

16 Claims, 12 Drawing Sheets

SYSTEM AND METHOD FOR HETEROGENEOUS MODEL COMPOSITION

CROSS-REFERENCE TO RELATED APPLICATIONS

This application claims the benefit of U.S. Provisional Application No. 63/087,391 filed 5 Oct. 2020 and U.S. Provisional Application Ser. No. 63/212,757 filed on 21 Jun. 2021, each of which is incorporated in its entirety by this reference.

TECHNICAL FIELD

This invention relates generally to the machine learning field, and more specifically to a new and useful model composition execution in the machine learning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
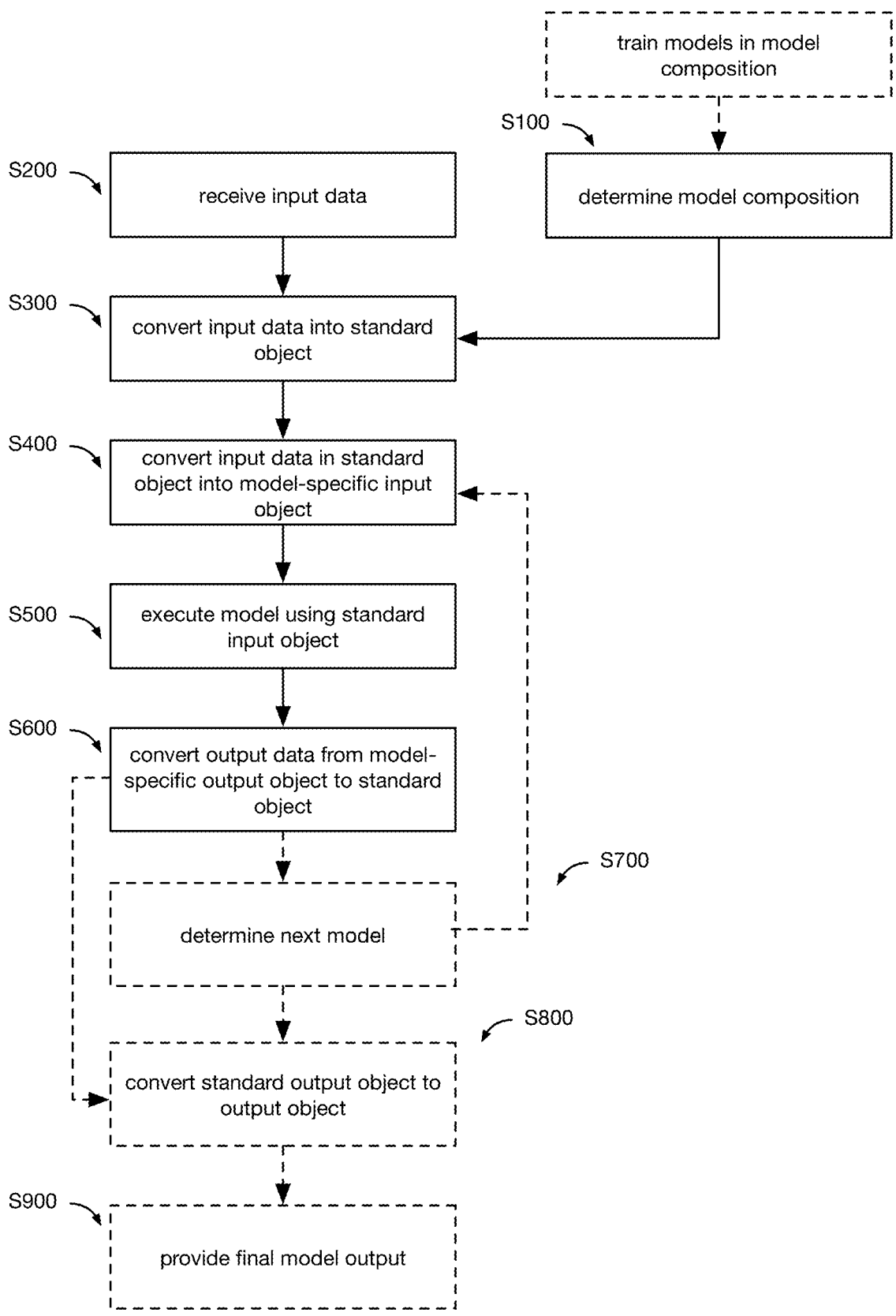
FIG. 2 is a schematic representation of the method.

As shown in FIG. 2, the method for standardized model interaction can include: determining a model composition S100, receiving input S200, converting the input into a standard object S30, converting the standardized input into a model-specific input (MSI) object S400, executing the model using the MSI object S500, converting the output from a model-specific output (MSO) object to a standard object Shoo, optionally repeating S400-S600 for child models S700, optionally converting the standardized output to an output object S800, optionally providing a final model output to an endpoint S900, and/or any other suitable element.

Figure 1:
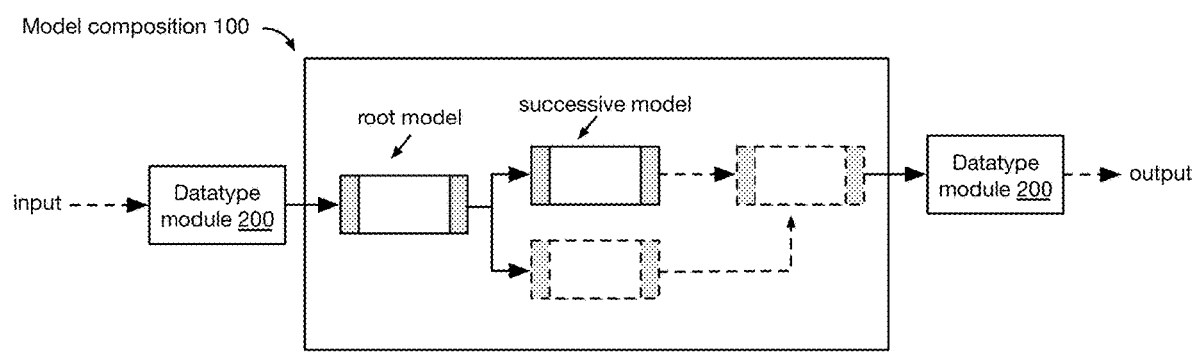
FIG. 1 is a schematic representation of an example of the system.

As shown in FIG. 1, the system for standardized model interaction can include: a set of models 100, optionally a set of data modules 200, and/or any other suitable components. In variants, models from the set can be composited into one or more model compositions 100. In variants, each model within the series of different models can include a handler and a primary model. The system functions to define and facilitate data transformation through the series of different models. The system can additionally determine a subset of models and optionally the respective inputs needed to obtain a selected output, and selectively execute the model subset.

The technology can function to process one or more inputs using a unitary workflow formed from a set of previously-incompatible models, such as models authored by different authors or models with incompatible outputs and inputs.

2. Examples

Figure 12:
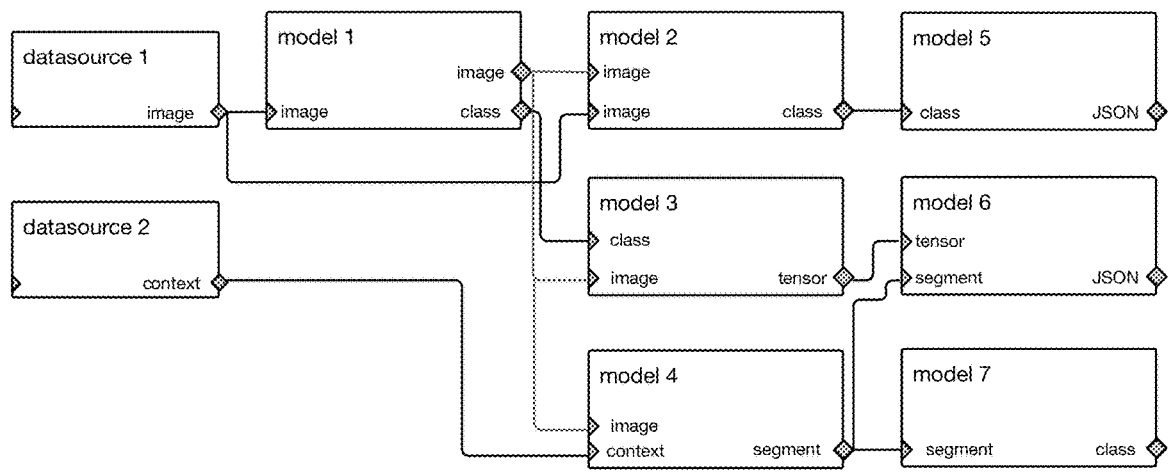
FIG. 12 depicts an illustrative example of a model composition.

In an illustrative example, the method includes: determining a set of models connected by inputs and outputs (example shown in FIG. 12); receiving input data; converting the input data into a standard object (e.g., a tensor; deserializing the data; etc.); identifying the next model in the model set (e.g., the first model in the composition); converting the standardized input object into a model-specific input (MSI) object for the next model; executing the next model within the set of models using the MSI object to generate a model output as a model-specific output (MSO) object; converting the model output from the MSO object to a standard object (e.g., the standard object); and repeating the method for the next model in the model set (e.g., for each successive model; for one or more child models of the model, etc.), using the standard model object from the model as the standard input object for the next model. The model outputs from the final models can be converted into an output format (e.g., a standard or nonstandard datatype; by serializing the final model output, etc.). In variants, each model can include a model-specific handler and a primary model, wherein the model-specific handler includes a preprocessor, configured to convert the standardized input data to the MSI object (e.g., to an MSI format), and a postprocessor, configured to convert the MSO object (e.g., in an MSO format) to a standard object (e.g., a standard output object; object in a standard format). Each model can be authored by different authors (e.g., different entities). Each model (e.g., primary model) can be trained independently or together, with the other models within the composition. One or more of the primary models can have incompatible inputs and/or outputs from another connected (e.g., preceding or succeeding) primary model (e.g., have different formats, different datatypes, different dimensions, etc.). In variants, data deserialization, serialization, preprocessing, and/or postprocessing can be performed on the platform, while primary model execution can be performed in a runtime engine (e.g., specific to the primary model, shared across primary models, etc.); however, all or portions of the method can be performed entirely on the platform, in a decentralized computing environment, in the runtime engine, and/or in any other suitable computing environment.

3. Benefits

The technology can confer several benefits over conventional standardized model interaction technology.

First, the technology can enable simple deployment of model inference to enable simple, scalable, composable, performant, sharable inference of a series of different models from different model sources (e.g., open-source learning libraries).

Second, variants of the technology can enable disparate machine learning models (e.g., neural networks, etc.) that have incompatible inputs and outputs to be composed into a unitary, higher level model. In particular, this allows research-grade models to be interoperable, such that they can be used in production (e.g., commercial applications), which was previously impossible because research groups do not adhere to a universal development standard, and therefore generated models with incompatible inputs and outputs. This technology allows users to build arbitrarily complex graphs by combining these models (e.g., into novel system definitions), instead of creating bespoke models for their use case.

Fourth, variants of the system can define a set of intuitive datatypes (e.g., standard data types, base data types, etc.) to facilitate user interaction and inter-model interaction.

Figure 13:
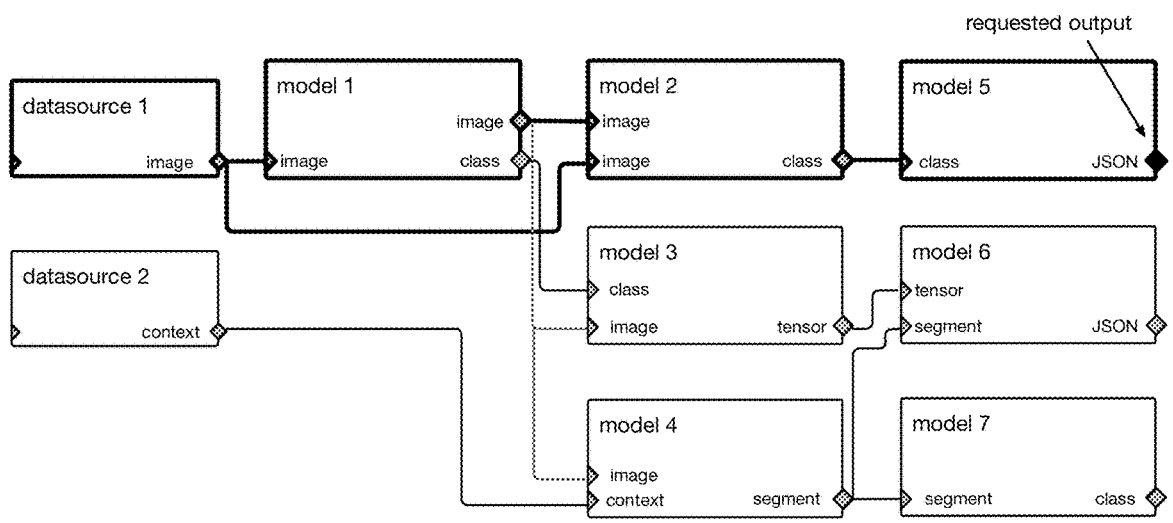
FIG. 13 depicts a first illustrative example of determining a model subset from the model composition for a selected output.
Figure 14:
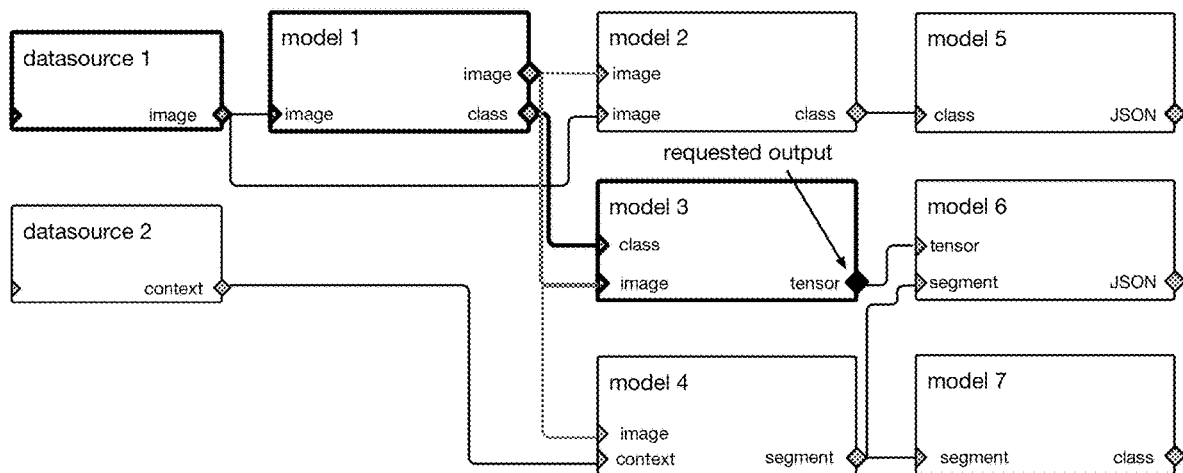
FIG. 14 depicts a second illustrative example of determining a model subset from the model composition for a selected output.

Fifth, variants of the technology can increase computational efficiency by determining the subset of models—and optionally the respective inputs—from the model composition that are associated with (e.g., needed to) obtain a selected output, and selectively executing only the model subset rather than the entire model set within the model composition (examples shown in FIG. 13 and FIG. 14, wherein the subsets are indicated in heavy line). Variants of the method can additionally or alternatively include identifying the model layers of each model within the model subset that are associated with (e.g., required to obtain) the selected output, and selectively executing the identified model layers for each model.

However, the method and system can confer any other suitable benefits.

4. System

The method is preferably performed using a system including a set of model compositions 100, optionally a set of data modules 200, and/or any other suitable components. However, the method can be performed with any other suitable system.

The model composition 100 can function to provide different processing architectures and computations for different domains. The model composition can include a set of models. The models within the model composition are preferably interconnected (e.g., with one or more outputs of parent models connected to the inputs of one or more child models, etc.; examples shown in FIG. 6 and FIG. 8), but can be unconnected, share subcomponents (e.g., layers, submodels, etc.), and/or otherwise related. For example, the model composition can include a series of different models connected into a tree or directed acyclic graph (DAG), but other structures can be used. Each model within the series of different models can be identified as a parent model, a child model, a root model, a leaf model, and/or any other suitable models. The child models can be directly or indirectly connected to the parent model.

However, the model composition can be otherwise configured.

Figure 8:
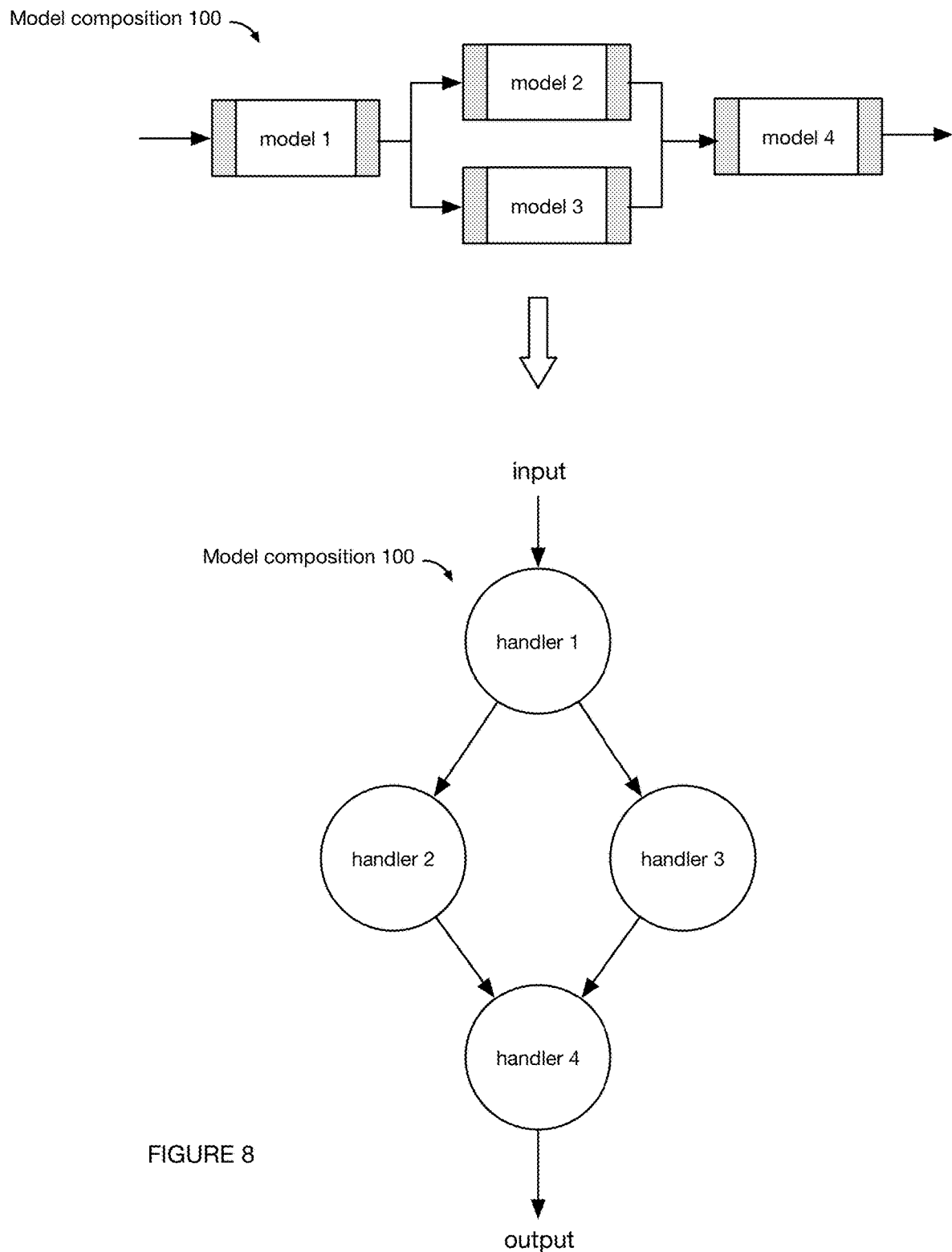
FIG. 8 depicts an example of model composition representation.

The model composition can be defined and/or represented (e.g., graphically, in storage, etc.) as by a set of model identifiers, a set of handler identifiers (e.g., associated with their respective models; example shown in FIG. 8), and/or be otherwise defined. The model composition can additionally or alternatively include connections between one or more of the one or more inputs and outputs of adjacent models (example shown in FIG. 12), the handlers of adjacent models, the primary models of adjacent models, and/or any other suitable set of connections or relationships (e.g., edges). The connections between models can additionally or alternatively be associated with computations (e.g., addition, subtraction, multiplication, averaging, etc.; example shown in FIG. 10), transformations (e.g., concatenation, transposition, zero-padding, etc.), and/or other data manipulations of the model output before provision to the next model.

The model composition can be specified by a user (e.g., using a GUI or other interface), automatically specified (e.g., based on a model composition template, for a given use case, etc.), predetermined (e.g., by another user), and/or otherwise determined. For example, a model composition can be specified by dragging and dropping models from a model sidebar, and connecting model outputs with other model outputs. In a second example, all or portions of the model composition can be automatically specified based on the use case or domain. In an illustrative example, a set of 2D feature extractors can be automatically populated and connected to an image datasource for an image classification use case.

Different models in the set can be generated (e.g., authored, trained, etc.) by different entities (e.g., users, institutions, organizations, research groups, etc.), or be generated by the same entity. Different models in the set (e.g., primary models) preferably have input and output objects that are specific to the given model (e.g., MSI formatted inputs and MSO formatted outputs, respectively) and/or different from the input and/or output objects of other models, but can alternatively share a common format. Different models in the set can have the same or different base model (e.g., untrained model). Different models in the set can be trained using the same or different: hyperparameter set, training data, validation data, testing data, hardware, and/or other training parameters. For example, different models in the same model composition can have the same underlying model (e.g., both be BERT models), but be trained using different hyperparameters and training data. This can be useful for A/B testing, for model selection (e.g., by selecting the model or output with the smallest uncertainty), and/or otherwise used. However, the models in the model composition can be otherwise related or unrelated.

The set of different models can be stored on local storage (e.g., local to the interface, local to a user), an online repository (e.g., Github™), cloud storage (e.g., AWS, Google Cloud), in one or more model databases, and/or stored in any other suitable storage location. Each model can be identified and/or retrieved using a model identifier (e.g., unique or shared), or otherwise retrieved. Examples of the model identifier include: a filepath, a URI, a model name, and/or any other suitable identifier. Each model can optionally be associated with metadata, such as the model version, a model description, popularity (e.g., usage frequency, etc.), and/or other metadata.

The models in the model composition can be trained together (e.g., wherein the model composition is trained as a whole, using a common training dataset), be trained individually (e.g., using the same or different training datasets for each model), or be otherwise trained. In the former variant, the systems and methods discussed herein can be used to transfer data between the models of the model composition. Training methods that can be used include: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style.

Each model can be associated with one or more execution functions. For example, each model can be associated with a training loop that, when executed, trains the model, and an inference function that, when executed, performs inference given input data. The execution functions preferably operate on MSI objects (e.g., data in the MSI-format) for the respective model, but can alternatively operate on standard objects (e.g., data in the standard format), or in any other suitable format.

Each model can include a primary model, a preprocessor, and a postprocessor, but can additionally or alternatively include only a primary model, include only a handler, and/or be otherwise constructed. The preprocessor and postprocessor are preferably bundled into a handler, but can alternatively be separate components.

Each model can accept one or more inputs, and can return one or more outputs. The number of model inputs and outputs preferably correspond to (e.g., are dictated by) the number of primary model inputs and outputs, but can alternatively be more or less.

The primary model of the model functions to make a prediction based on the input data (e.g., perform inference on the input data; transform the input data into output data; analyze the input data; etc.) The primary model can include one or more: machine learning models, state estimators, clustering models, matching models, optimizations, physics models, and/or any other suitable model. Examples of machine learning models that can be used include: regression models, classifiers, generative models, discriminative models, clustering models, ensemble methods, deep learning models, an ensemble or cascade of sub-models, and/or any other suitable machine learning model. The primary model can be a single model, multiple models (e.g., cascade of models, model ensemble, model composition, etc.), and/or any other suitable number of models.

The primary model can be generated by one or more entities (e.g., users, institutions, organizations, research groups, etc.). The primary model can be authored by one or more entities (e.g., users, institutions, organizations, research groups, etc.).

The primary model can accept one input, multiple inputs, and/or any other suitable number of inputs. The primary model can return one output, multiple outputs, and/or any other suitable number of outputs. The primary model preferably accepts inputs that are specific to the given model (e.g., MSI objects, MSI formatted inputs), but can alternatively accept inputs that are not specific to a given model (e.g., standardized inputs.

The primary model can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm.

The models can be stored in a model repository through the platform, local storage (e.g., local to the interface, local to a user), an online repository (e.g., Github™), cloud storage (e.g., AWS, Google Cloud), in one or more model databases, and/or stored in any other suitable storage location.

The model composition can include one or more handlers, wherein each handler functions to convert (e.g., encode) data between a standard object and a model-specific object (MS object). A handler can: transform the shape of the standardized object to a model-specific shape (and/or vice versa); compose one or more standardized objects into a complex, model-specific object; convert data between datatypes (e.g., from a standard datatype to a MS datatype and/or vice versa); convert data between data formats (e.g., from a standard format to a MS format and/or vice versa); and/or otherwise transform data between the standard object and the MS object. One or more data attributes are preferably shared between the standard object and corresponding MS object (e.g., similar datatypes, similar formats, similar dimensions, etc.), but can alternatively entirely differ. For example, a handler can convert a data in a standard tensor format (e.g., a platform-standard format, such as a GridTensor) into a model-specific tensor format. For example, the handler can convert data from an image format into a model-specific image format (e.g. by padding or cropping the image, etc.) or model-specific datatype (e.g., a model-specific tensor). A handler can additionally or alternatively convert a nonstandard data object to a standard object, then from the standard object to a MS object (and/or vice versa).

A handler can optionally provide introspection methods that can be used to validate that model inputs and outputs are compatible with the respective model, validate that the parameters required by the model are received, orchestrate model execution (e.g., perform all or parts of the method, determine which functions are run when, specify the hyperparameters for the model, specify the hardware parameters for the model, etc.), process inputs and/or outputs of a given model, and/or perform other functionalities. For example, the handler can: receive input data, convert the input data to a standardized input object, process the standard object to generate the MSI object, coordinate model execution (e.g., using the MSI object) on a runtime engine, receive an MSO object, process the MSO object to generate a standardized output object, and convert the standardized output object to output data. A handler can be: a library, an API, a function, a set of functions (e.g., a set of processing tasks specific to a particular input and/or output of a model), and/or be otherwise defined.

Each handler is preferably specific to a model, but can alternatively be specific to a subset of models (e.g., a class of models, models sharing a common domain, etc.), a particular input and/or output of a model, a input attribute combination (e.g., a handler for 2048×1536px images), a datatype, a domain, a use case (e.g., image classification, NLP, binning, prediction, etc.), and/or otherwise shared or unique. For example, each handler can be specific to both the expected input and/or output data format (e.g., standard data format) and the model-specific data format (e.g., required by the model; defined by the model structure; etc.). The handler for a given model can be separate from the model (e.g., wherein the handler is called as a precursor and/or postprocessing method before and/or after model execution), incorporated within the model (e.g., as a model function; as a model subcomponent; etc.), and/or otherwise related to the model. Each model can be associated with one or more handlers (e.g., different handlers for pre/post processing, for different use cases, for different standardized input datatypes, etc.). Each handler can be authored by the respective model author (e.g., primary model author), by the user composing the models together, automatically determined by the platform (e.g., selected, generated, etc.), and/or otherwise determined.

The handlers can be stored with the respective model, stored in a separate database, and/or otherwise stored. The handlers can be executed in the same computing environment as the model, executed in a different computing environment, and/or otherwise executed.

Figure 5:
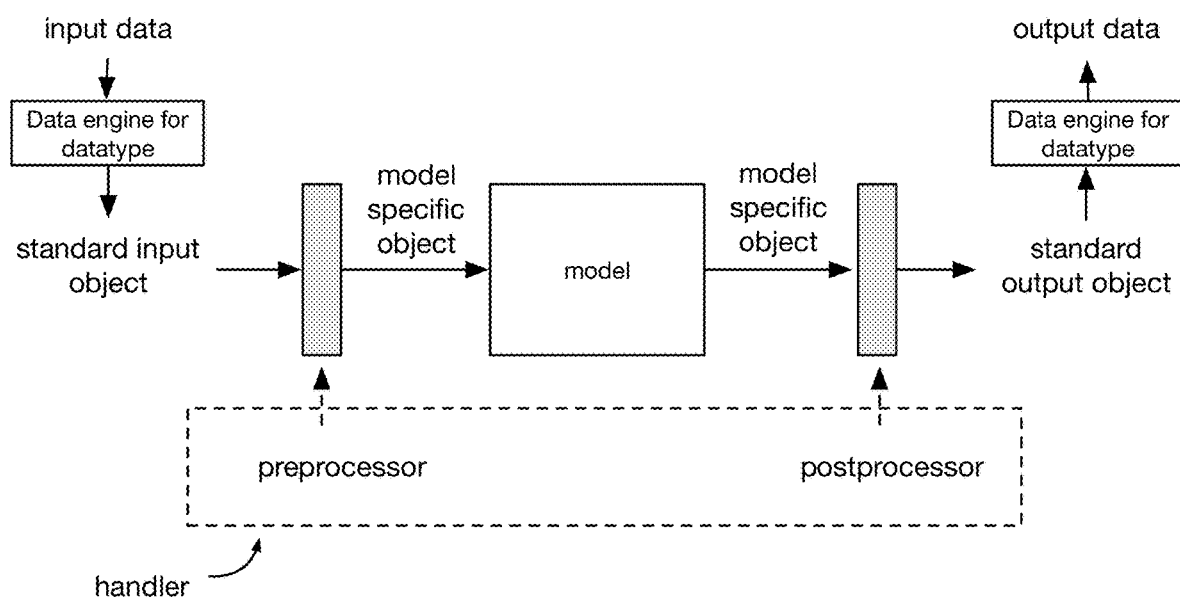
FIG. 5 depicts an example of data transformation between system components.

Each handler can include one or more preprocessors (e.g., preprocessing modules) and postprocessors (e.g., postprocessing modules), example shown in FIG. 5. The preprocessor preferably converts data from the standard object into the MSI object for the respective model (e.g., from a standard format to a MS format, etc.), but can additionally or alternatively convert data directly from a standard object to the MSI object, and/or convert data in any other suitable object to the MSI object. The postprocessor preferably converts data from the MSO object for the respective model into a standard object (e.g., from a MS format to a standard format for the same or different datatype, etc.), but can additionally or alternatively convert data directly from the MSO object to a standard object, and/or convert data in the MSO object to any other suitable object. The transformation between data objects by the preprocessor and the postprocessor can be: hardcoded, retrieved from database (e.g., based on model identifier), dynamically determined (e.g., based on the data attributes specified in the model specifications, based on the data attributes of the data input into the pre/postprocessor), and/or otherwise determined.

When the model includes multiple inputs and/or outputs, the model and/or respective handler can include a preprocessor for each input, a preprocessor for all inputs of the model, multiple preprocessors for each input (e.g., one for each standard datatype, etc.), a postprocessor for each output, a postprocessor for all outputs of the model, multiple postprocessor for each output (e.g., one for each standard datatype, etc.), and/or any other suitable number of preprocessors and/or postprocessors.

Each handler is preferably defined by the entity creating the model, but can alternatively be defined by another entity, automatically defined, and/or otherwise defined.

In a first variant, the model data (e.g., model-specific input and/or output type, determined from the model specification) can be matched with the closest standard datatype (e.g., matching strings to strings, images to images, audio to audio, etc.), wherein a handler template associated with the standard datatype can be modified (e.g., based on a transform between the model datatype and the standard datatype) to create the handler or portion thereof. The handler template can be automatically modified (e.g., until an error of the model output using the handler-processed data falls below a threshold), manually modified, and/or otherwise modified.

In a second variant, the handler can be generated using a neural network (e.g., specific to a standard datatype) that is trained to convert data (e.g., having the standard datatype) to the standard object.

In a third variant, the handler can be generated by computing a transform between the standard object and the MS object.

In a fourth variant, the handler is manually coded by a user.

However, the handler can be otherwise generated.

The set of data modules 200 can function to convert data having a known datatype between the datatype and the standard object (e.g., standard-formatted data). Additionally or alternatively, each data module can translate data (e.g., data object, data structure) into a storable or transmittable format, or series of bytes (e.g., by serializing the data), and/or extract data from a series of bytes (e.g., by deserializing the data). In an example, the data module can convert a series of bytes into input images, and/or convert input images into a series of bytes. In another example, the data module can convert a nonstandard image to a standard image format. In another example, the data module can convert an image or point cloud to a tensor (e.g., in a standard format). data module The data module can include: a deserializer, a serializer, and/or any other suitable component. Different data modules are preferably specific to a given datatype (e.g., data object, data structure, etc.), but can alternatively be shared between datatypes. Each data module can concurrently accept one or more inputs of the same or different type; alternatively, different instances of a data module can be used to concurrently process multiple pieces of data. The data modules are preferably configured to translate standard data (e.g., platform-standard data formats, data objects, etc.), but can additionally or alternatively be configured to translate nonstandard data (e.g., MS data, proprietary formats, etc.) and/or other data.

Each model composition is preferably associated with one or more data modules. The data modules can be shared across model compositions (e.g., the same data module can be used by different model compositions), or be specific to the model composition. Each model composition preferably includes at least one data module (e.g., a deserializer) to process the model composition input (e.g., input into the first model of the model composition), and includes at least one data module (e.g., serializer) to process the model composition output (e.g., standardized output of the last model of the model composition). However, the model composition can be associated with (e.g., include) a data module for each constituent model input and/or output (e.g., when primary model execution is in a different computing environment than preprocessing, postprocessing, data storage, and/or data transfer between successive models), a data module for each input and output of a model composition subseries (e.g., subgraph of models within the model composition), and/or any other suitable number of data modules.

In a first example, the one or more deserializers can be connected to the root models within the model composition and the one or more serializers can be connected to the leaf models within the model composition. In a second example, the one or more deserializers and one or more serializers can be connected to any model within the model composition. In a third example, every model within the model composition can be connected to a specific deserializer and serializer. The data modules associated with the model composition are preferably configured for the respective datatype to be translated, but can additionally or alternatively be configured to translate other datatypes.

However, the data module can be otherwise associated with the models within the model composition.

The data modules can be standard (e.g., for a predetermined datatype) and shared between handlers and/or models, but can alternatively be model-specific, handler-specific, specific to a data subtype, and/or otherwise defined. The data modules can be separate from the handlers and models or be integrated into the handler and/or model. The data module can be stored on local storage (e.g., local to the interface, local to a user), an online repository (e.g., Github™), cloud storage (e.g., AWS, Google Cloud), in one or more data module databases, and/or stored in any other suitable storage location. The data module can be manually selected (e.g., by an entity), automatically selected (e.g., based on input/output specification for the: input data, input specification of root models, output data (e.g., user specified), output specifications of leaf models, and/or otherwise selected.

The system can be used with data, which can function to represent information values. The data can be input data, output data, intermediary data, and/or other data. The data can be the input and/or output of the model composition, the input and/or output of a specific model within the model composition, and/or any other suitable data. The data can be a nonstandard object, a non-model-specific object, a standard object (e.g., platform-standard object, globally standard object, etc.), a model-specific object (MS object), and/or be any other suitable object. Data objects can be defined by: the datatype (e.g., image, array, string, float, character, Boolean, etc.), shape or dimension (e.g., length, width, numrows, numcols, etc.), data value arrangement (e.g., the variables each row, column, or pixel represent), the file format (e.g., storage encoding; bit encoding, etc.), data interchange format, and/or other data attributes. Standard output objects can be the same or different object types as standard input objects (e.g., have the same format, have the same datatype, etc.). Descriptions of datatypes, data formats, data objects, data structures, and/or other data characterizations herein can be interchangeably applied to other data characteristics or attributes (e.g., handlers can convert data from nonstandard datatypes to standard datatypes and vice versa).

The data can be: retrieved from a database (e.g., session storage, third party storage, etc.; using a data identifier, such as a filepath, URI, pointer, filename, etc.), received from a user (e.g., uploaded at an interface, etc.), automatically identified, received from a data stream, retrieved from a third party endpoint (etc. API, subscription hook), and/or otherwise determined.

Figure 4:
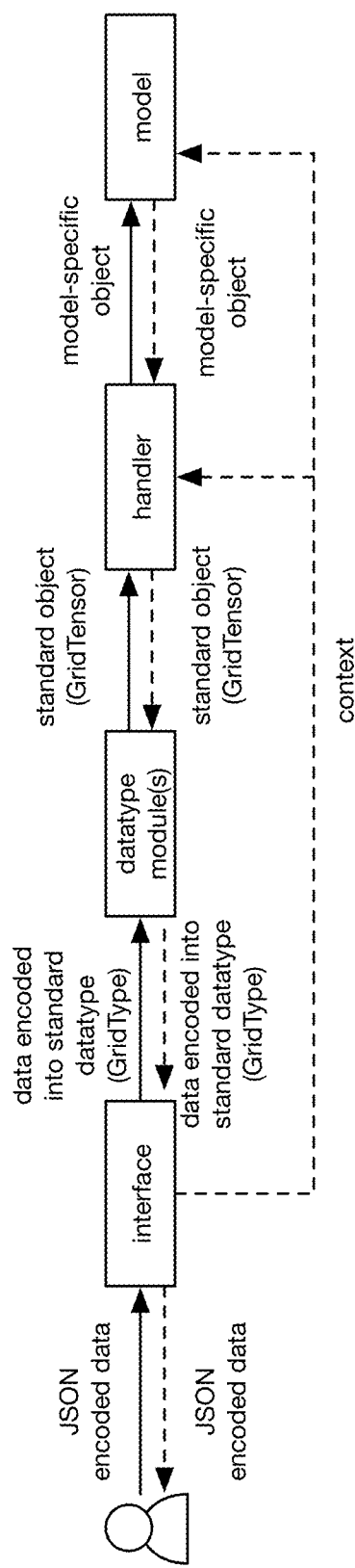
FIG. 4 depicts a specific example of data transformation between system components.

The data can include a dataset, a single piece of data (e.g., datum), and/or be otherwise constructed. The data can be associated with one or more known or unknown datatypes (e.g., data classes). Examples of datatypes can include: images, text, strings, audio, video, signals, scalars, vectors, tensors, timeseries, models, matrices, point clouds, and/or any other suitable datatype. The datatype can be a standard datatype (e.g., wherein datatype is known and the system includes a data module for the respective datatype; standard datatype in a proprietary protocol; JSON, example shown in FIG. 4; etc.) or a nonstandard datatype (e.g., a model-specific datatype, wherein the datatype is unknown and/or requires a custom data module for datatype-standard object conversion). The data preferably includes values (e.g., for each channel, each pixel, each timestamp, each character, each cell, etc.), but can alternatively lack values.

The method can be used with a standard object, which is used to communicate the data between the handlers of different models. The system can include or support multiple standard objects. The standard object preferably has a single datatype, but can alternatively have or be multiple datatypes. The standard object preferably has a single data format (e.g., platform-standard format), but can additionally or alternatively have multiple data formats. The standard object can have a standard set of data attributes (e.g., for the data type), but can additionally or alternatively have a range of data attribute values, an undefined or unrestricted set of data attribute values, and/or be otherwise configured. The standard object is preferably a tensor or graph (e.g., GridTensor; FlashTensor; example shown in FIG. 4), but can alternatively be a scalar, a vector, a matrix, a tensor field, image, and/or have any other suitable representation. For example, the standard object can include a combination of NumPy objects.

In variants, storing the data as a graph (e.g., tensor graph) can be advantageous for quickly restoring the model (e.g., for inference) and/or restoring model variables without fully rebuilding and restoring the model. In other variants, tensors can be used as the standard object, since most machine learning models are compatible with tensors. However, other objects can be used and provide other benefits. The standard object preferably represents the data in a standard format, but can be otherwise used.

The method can be used with one or more model-specific objects (MS object), which is used within a model. Each model can have a different MS object; alternatively, different models can use the same MS object. The MS object can be defined by: the data format (e.g., esoteric model-specific format), the shapes or dimension (e.g., length, width, numrows, numcols, etc.), and/or any other suitable attributes. The MS object is preferably specific to the model, but can alternatively be shared between models. The MS object preferably represents the data in a model-specific format (MS format), but can be otherwise used. The MS object preferably has a single datatype, but can alternatively have multiple datatypes. Each model preferably uses one or more model-specific input objects (MSI objects) and one or more model-specific output objects (MSO objects). The MSI objects preferably represent model inputs in the model-specific input format (MSI format), and represent the MSO objects represent model outputs in the model-specific output format (MSO format), but can additionally or alternatively represent model inputs and outputs using MSI/MSO datatypes, dimensions, and/or other data attributes. The MSI objects can have the same or different data attributes as the MSO objects.

The method can optionally be used with context data, which functions to add context to model execution. The context can be applicable to the entire model composition, to a specific model, and/or otherwise used by the models. The context can represent: the operating environment, sensor data (e.g., monitoring a world state), session data (e.g., runtime, session identifier, etc.), prior state, previously determined data values, tracing data (e.g., trace, metric, log, baggage, etc.), and/or any other suitable information. The handlers are preferably blind to the context (e.g., wherein the context can be directly provided to the models), but can alternatively process the context into a MS object.

However, the method can be performed with any other suitable data.

The interface functions to enable the user and/or entity to interact with the system. The interface can include: a user interface, a user input, GUI, API, and/or any other suitable interface. For example, the interface can receive: input data, model inputs, session identifiers, commands, model composition information (e.g., models to composite, which outputs to connect to which inputs, etc.), requests (e.g., model execution requests, including model composition identifiers, input data identifiers, etc.), and/or other input information, and can provide runtime outputs, analytics, and/or other output information. The interface can optionally convert inputs from a first protocol to inputs in a platform-specific protocol. For example, the interface can convert a JSON-encoded object to a standard datatype. The interface can be a mobile application, web application, desktop application, an API, and/or any other suitable interface executing on a user device, gateway, and/or other computing system. In a first example, the interface can be a drag-and-drop interface that enables a user to create a model composition. In an illustrative example, a user can drag-and-drop a first and second model from a model toolbar or library into a virtual workspace, and drag-and-drop an output from the first model to connect to an input of the second model. In a second example, the interface can be a command line interface or programming interface, wherein the user can enter a model identifier (e.g., "model 1", "model 2", etc.) and/or endpoint identifiers (e.g., "datasource1", "output_endpoint1", and specify the input/output connections between the endpoints and/or model input/outputs (e.g., datasource1::model.input1 model1.output2::model2.input1, model1.output1::output_endpoint1 etc.). However, any other suitable interface can be provided.

The system can include a platform, executing on a computing system, that functions to concurrently and/or asynchronously coordinate and/or perform method execution, model composition creation, and/or other functionalities for one or more: users, user accounts, model compositions, and/or other entities. The platform can additionally or alternatively select a subset of models within the model composition to execute, provision machines for model execution, facilitate model composition (e.g., model composition generation), store model composition, orchestrate model composition (and/or model) execution, and/or perform any other suitable functionalities. The platform can facilitate the execution of one or more instances of one or more model compositions in parallel, in series, and/or with any other suitable timing.

The computing system functions to execute the method and/or components discussed above. The computing system can be a local system, a cloud computing system (e.g., remote system), a distributed computing system, and/or any other suitable computing environment.

The session storage functions to store runtime data during model composition execution. The session storage can be local, remote (e.g., cloud storage), part of the platform, separate from the platform, part of the runtime environment, and/or otherwise configured. The session storage can store: model inputs, model outputs, intermediary model states (e.g., values between model layers), context, and/or other data. The session storage can store data as a standard object (e.g., in the standard format, standard datatype, etc.), as a MSI object, and/or as any other suitable object. The session storage can be specific to a model (or instance thereof), specific to a model composition (or instance thereof), shared between models (or instances thereof), shared between model compositions (or instances thereof), or otherwise shared or unshared. The system can additionally or alternatively include or interface with one or more external computing environments. The external computing environments can be: model author environments, user environments (e.g., a user's on-prem computing system, a user's cloud computing environment, etc.), and/or any other suitable computing environment.

5. Method

The method can include: determining a model composition S100, receiving an input S200, converting the input into a standard object S300, converting the standardized input into a MSI object S400, executing the model using the MSI input S500, converting the output from an MSO object to a standard object S600, optionally repeating S400-S600 for each successive model S700, optionally converting the standardized output to an output object S800, optionally providing a final model output to an endpoint S900, and/or any other suitable element.

All or portions of the method can be performed by: the platform, a third party execution system, and/or any other suitable computing system. In a first example, the method is entirely executed on the platform. In a second example, the platform performs the standardized data transformations and optionally the standard data-to-MS data transformations (e.g., serialization, deserialization, preprocessing, postprocessing, etc.). In a third example, standardized data transformations (e.g., serialization, deserialization, etc.) are performed by the platform, while all other data processing (e.g., preprocessing, postprocessing, model prediction, etc.) is offloaded to the external computing environment(s) executing the respective models. In this example, the platform can optionally call the handler functions with the passed data. In a fourth example, all data transformations and processing are performed on the external computing environment(s), wherein the platform tracks and provides the data storage locations to the respective models. However, the method can be otherwise executed by any other suitable set of computing environments and/or resources.

The method can be performed in response to receipt of an execution request (e.g., train request, inference request, etc.); in response to receipt of the input data and the model composition (and/or identifiers thereof), and/or at any other suitable time. A method instance can be identified by a session identifier or be otherwise identified. The method can be performed by different entities (e.g., users, institutions, organizations, research groups, etc.), or by the same entity. The method can be iteratively performed, performed once, and/or performed any number of times. One or more instances of the method can be performed (e.g., concurrently, sequentially, etc.) for the same or different model compositions.

One or more steps of the method can be iteratively performed for successive models. For example, S200-S600 can be repeated for each successive model in the model composition, wherein the MSO and MSI can be specific to the respective model. In a second example, S300-S800 can be repeated for each successive model in the model composition, wherein the MSO and MSI can be specific to the respective model, and the data (e.g., a standard data object) can be deserialized and serialized between each model (e.g., for transmission to the runtime engine). The method can be executed for inference, training, validation, testing, and/or any other suitable model construction.

5.1 Determining a Model Composition S100.

Determining a model composition S100 functions to determine the series of different models. S100 is preferably performed by the platform, but can alternatively be performed by a third party execution system. S100 can be performed before S200, concurrently with S200, and/or before, after, concurrently with any other step.

S100 can include compositing the series of different models, wherein the series of different models can include neural networks, regression models, ruleset models, ML models (regression, classifiers, generative models, discriminative models, clustering models, ensemble models, deep learning models, ensemble or cascade of models), state estimators, clustering models, matching models, optimizations, physics models, and/or any other suitable model. The model is preferably trained, but can alternatively be untrained.

S100 can include receiving the model composition, retrieving the model composition from a database, learning the model composition, or otherwise determining the model composition.

The model composition can be received as a data structure, a set of values for each of a set of model composition attributes, a set of pointers, a graph, and/or as any other suitable specification (e.g., specifying values for each model composition attribute). The model composition specification can include: the model identifiers for the models within the composition, the number of instances for each model, the connections between the models (e.g., which outputs should be connected to which inputs), the data endpoint identifiers (e.g., input data endpoints, data output endpoints, etc.), the connections between the data endpoints and the models (e.g., what data should be provided to a given model input head, where output data should be sent, etc.), the connections between context data (e.g., context data sources) and the models (e.g., which input head each piece of context data should be provided to), and/or specifications for other model composition attributes. The hardware that the model composition and/or each model is executed on can be specified by: the respective model, the model composition specification, the user (e.g., as part of a model composition execution request), randomly selected, selected as a default, and/or otherwise determined.

The model composition can be: automatically determined (e.g., retrieved from memory), manually specified (e.g., in an execution request, in a GUI, etc.), and/or otherwise performed.

In a first variant, S100 can include receiving the model composition from a user, wherein the user specifies the values for each model composition attribute. The model composition can be received via a GUI, a CLI, and/or any other suitable interface. In a first example, the user can select a root model, drag the selected root model to a virtual workspace, drop the selected root model, select a successive model, drag the selected successive model to the virtual workspace, drop the selected successive model, connect the selected successive model to the selected root model, and repeat for other successive models; example shown in FIG. 1*i*. In a second example, the user can input a specification, wherein the specification includes the models, input connections, and output connections. The specification can be a file, one line of code (e.g., for model 2: model2.input: model1.output2), a few lines of code, and/or otherwise structured.

Figure 7:
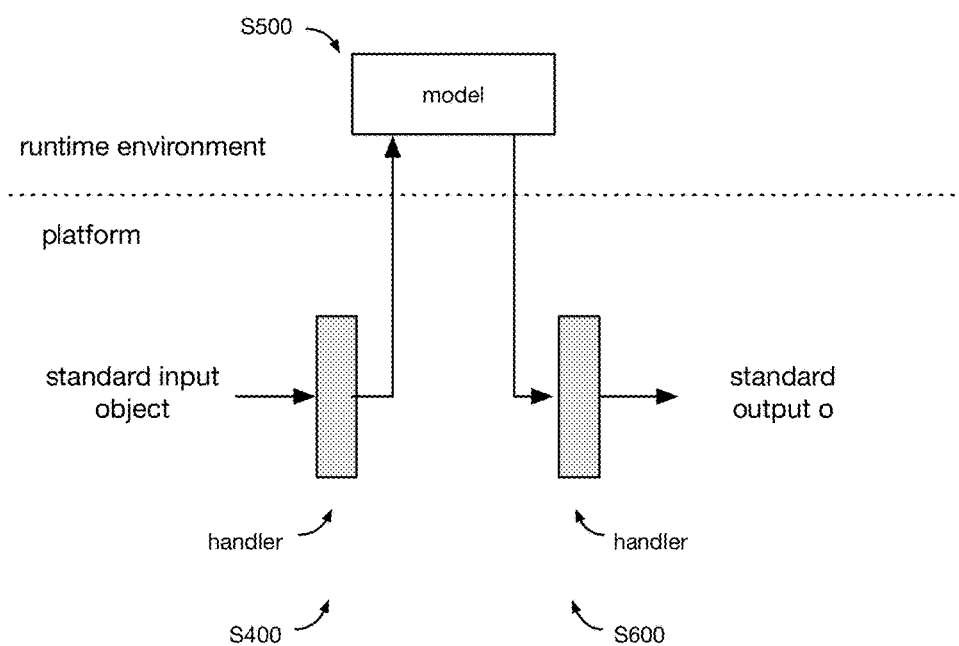
FIG. 7 depicts an example of platform-runtime environment split.

In a second variant, S100 can include retrieving the model composition from a database, wherein the database includes model compositions determined previously by a user, previously learned, or otherwise determined. In a first example, this can include: extracting a model composition identifier from an execution request, retrieving the model composition specification from a database, retrieving the models and associated handlers identified in the model composition specification from the model database, and optionally loading the models into the runtime environment (e.g., example shown in FIG. 7).

However, the model compositions and/or models can be otherwise determined.

S100 can additionally or alternatively include selecting a model subset from the model composition. This can function to isolate execution to only the model that are required to compute a requested output. The model subset is preferably selected based on the models needed to generate a given output (e.g., a user-selected output), wherein the output can be an intermediate output (e.g., an output of an intermediate model), a terminal output (e.g., an output of a terminal or final model), and/or any other suitable output (examples shown in FIG. 13 and FIG. 14). The model subset can be selected: automatically (e.g., based on a selected output head), manually, and/or otherwise selected. The model subset can be selected using a graph search algorithm (e.g., a breadth first search, a depth first search, Dijkstra's algorithm, Euclidean shortest path, Johnson's algorithm, etc.), based on the estimated output uncertainty (e.g., wherein a model subset estimated to produce a lower-uncertainty output can be selected over another model subset candidate), randomly selected, and/or otherwise selected. The model subset can include models that form a path within the DAG between two models, models that form a path within the DAG between the root model and the leaf model, models that do not form a path, and/or any other suitable model subset.

One or more model subsets can be selected for the same or different requested output. When different model subsets are selected (e.g., for different requested outputs), the model subsets can intersect (e.g., different model subsets with overlapping models) or not intersect (e.g., different model subsets with distinct models).

S100 can additionally or alternatively include selecting a model layer subset within the model composition. This can function to isolate execution to only the layers of each model that are required to compute a requested output. Similar to model subset selection, the model layers can be selected automatically, manually, and/or otherwise selected. In variants, the models themselves can be represented as graphs (e.g., subgraphs within the higher-order model composition graph, wherein each node of each subgraph is associated with a model layer), such that the search algorithms used to identify the model subset can be equally applied to selecting the model layers. However, model layer subsets can be otherwise determined (e.g., by selecting the layers preassociated with different output heads, etc.). The model layer subset can include model layers for models that form a path within the DAG between two models, model layers for models that form a path within the DAG between the root model and the leaf model, model layers for models that do not form a path, and/or any other suitable model layer subset. One or more model layer subsets can be selected for the same or different requested output. When different model layer subsets are selected (e.g., for different requested outputs), model layer subsets can intersect (e.g., different model layer subsets with overlapping model layers) or not intersect (e.g., different model layer subsets with distinct model layers).

However, the model composition (and/or series of models to execute) can be otherwise determined.

5.2 Receiving Input S200.

Receiving input S200 functions to receive execution data, wherein the input is processed using the model composition to eventually generate a data output. S200 can be performed after S100 and before S300, and/or before, after, concurrently with any other step.

The input can be received by: the platform, a third party execution system, the computing system executing the models, the computing system managing data transfer, and/or any other suitable computing system. The input can be received from the user, automatically retrieved (e.g., from a datasource provided by the model composition, from a datasource identified in a request to execute the model composition, etc.), received from a parent model, or otherwise determined.

In a first variant, the input is uploaded by the user through the interface.

In a second variant, the input is retrieved from a database based on a data identifier (e.g., URL, filepath, dataset identifier, etc.) provided by the user (e.g., in the execution request).

However, the input can be otherwise determined.

The input can be stored in the session storage, retrieved on an as-needed basis (e.g., read in real-time from the data repository), not stored, and/or otherwise stored.

The input can include a dataset, a single piece of data (e.g., datum), and/or be otherwise constructed. The input data can be associated with one or more known or unknown datatypes (e.g., data classes). The input preferably has a standard datatype (e.g., image, audio, etc.), but can alternatively be a standard object (e.g., in the standard format, include a set of tensors, etc.), a non-standard datatype (e.g., a custom datatype or data format), and/or have any other suitable datatype. For example, the initial input received from a user can be in a standard or non-standard datatype, while the input received by a successive model (e.g., of the model composition) can be in the standard format (e.g., be a standard object). However, the input can be otherwise constructed.

In variants, S200 can include receiving a request, wherein the request includes the input data and/or the input endpoint (e.g., where input should be retrieved from), the model composition identifier, optionally a requested output, optionally the output object (e.g., output format, output datatype), optionally the output endpoint (e.g., where to send and/or store the output), and/or any other suitable information.

S200 can optionally include determining the input's datatype, which enables the respective data module to be retrieved and used in S300. In a first variation, the execution request specifies the input's datatype. This variation can optionally include verifying that the input actually has the specified input datatype (e.g., verifying that the input includes images, as specified by the execution request). This can be done with a compiler, the data module, and/or other component. In a second variation, the input's datatype is automatically determined (e.g., by a compiler, by comparing the input structure with template structures for each of a set of datatypes, etc.). In a third variation, the input's datatype can be determined from a model specification (or associated handler's specification). For example, the input's datatype can be determined from the model's variable definitions. However, the input's datatype can be otherwise determined.

5.3 Converting the input into a standard object S300.

Converting the input data into a standard object S300 functions to enable handlers to work with the same data format, object, and/or datatype, which, in turn, enables interoperability between models developed under different specifications. S300 can be performed on: the platform, a third party execution system, and/or any other suitable computing system. S300 is preferably performed after S200 and before S400, but can alternatively be performed before, after, concurrently with any other step. S300 can be performed after receiving the input data S200, as a response to a request to execute the model, as a response to a request to execute the model composition, or otherwise performed. S300 can be performed independent of S100 (e.g., independent of model composition determination), or can be performed based on the model composition specification (e.g., wherein the input is converted to the standard object specified by the model composition specification). S300 is preferably performed once for each model composition, but can alternatively be performed multiple times for each model composition, be performed before execution of each model, or otherwise performed. In an example, S300 can be performed once for the initial input data only. In another example, S300 can be performed for each successive model before providing the previous model's output to the successive model as the model input.

S300 is preferably performed by the data module for the input from S200, but can be performed by the handler or by another component.

In a first variant, S300 includes deserializing the input data. In this variant, S300 preferably includes deserializing the input data (e.g., binds the class fields to predefined tensorflow variables), but the conversion can be otherwise performed.

In a second variant, S300 includes transforming the input data to have a standard object attribute (e.g., format, datatype, etc.).

In the second variant, S300 can include converting the input data having a known datatype to the standard object. In an example, S300 can include converting the input, represented as an image (e.g., input datatype), to a tensor (e.g., standardized input). In another example, S300 can include converting the input, represented as audio (e.g., input datatype), to a tensor (e.g., standardized input).

In the second variant, S300 preferably converts the input data into a set of standard objects (e.g., having values representative of the input data's values or information), but can alternatively convert the input data into another datatype or any other suitable data object. Each datum can be converted into one or more standard objects, multiple pieces of data can be combined into a single standard object, or each datum can be converted into a single standard object; however, the input data can be otherwise related to the resultant set of standard objects. The conversion is preferably lossless, but can alternatively be lossy.

However, S300 can be otherwise performed.

5.4 Converting the Standardized Input into a Model-Specific Input (MSI) Object S400.

Converting the standardized input into a model-specific input (MSI) object S400 functions to convert the information from a universal representation (e.g., the standard object in the standard format) to a representation that the model can ingest and process. S400 is preferably performed after S300 and before S500 (e.g., for each model of the model composition and/or model subset), but can alternatively be performed before, after, concurrently with any other step. S400 can be executed on the same computing system as the model or executed on a different computing system.

S400 is preferably performed by the handler of each model (e.g., the preprocessor of the handler), but can alternatively be performed by an upstream handler or any other suitable component. S400 is preferably performed for each model within the model composition, but can be performed any other suitable number of times. S400 can be performed by the platform, by the third party computing system, and/or by any other suitable computing system. The MSI object (e.g., attributes thereof) is preferably specified by the model and the handler, but can alternatively be specified by the author, or otherwise determined. S400 can receive the standardized input from S300, the standardized input received from the endpoint, the standardized input from one or more preceding models, and/or otherwise received.

In a first variant, the preprocessor of the handler is configured to receive inputs as any one of a predetermined set of standard objects. In this variant, each predetermined standard object can be associated with a different preprocessor module; alternatively, a single preprocessor module can be configured to convert any standard object to the MS object. In a second variant, the preprocessor of the handler is customized to convert the parent model's output to the child model's input, wherein the child model's preprocessor is adjusted or specifically written for this conversion. However, the preprocessor can be otherwise configured.

In a first example, S400 can include transforming the shape of the standardized input to a MS shape (e.g., padding, concatenating, etc.), and/or composing one or more standardized input into a complex MSI. The MS shape can be specified by the primary model, wherein the transformation to achieve the MS shape can be dynamically determined based on the shape of the input data.

In a second example, S400 can include validating that the model inputs are compatible with the model and verifying that the model parameters required by the model are received.

In a third example, S400 can include introspecting the resultant standard object (e.g., from S300) to ensure that the standard object is compatible with the model (e.g., with the handler's preprocessor input requirements). This can include verifying that the standard object: has the handler-specified parameters, meets the handler-specified dimensions, and/or otherwise satisfies handler requirements.

S400 can include determining which standardized input characteristics (e.g., shape, standard format type) to transform to MSI and/or how to transform the standard object to the MSI. In a first variant, determining standardized input characteristics can include determining the standardized input characteristics from the previous model's output (e.g., of a prior iteration). In a second variant, determining standardized input characteristics can include determining the standardized input characteristics from data received by the preprocessor. In a third variant, determining standardized input characteristics can include predetermining the transformations before model execution. In a fourth variant, determining standardized input characteristics can include dynamically determining the transformations during model execution. In a fifth variant, the standardized input characteristics can be determined from the model specification of the parent model (e.g., wherein the model specification can specify the output's attributes). However, the standardized input characteristics and/or transforms can be otherwise determined. Determining the transformations can include calculating, selecting, padding, concatenating, or otherwise determined based on standardized input data metadata. For example, the standardized input matrix can be padded with zeros to increase the dimension.

Figure 6:
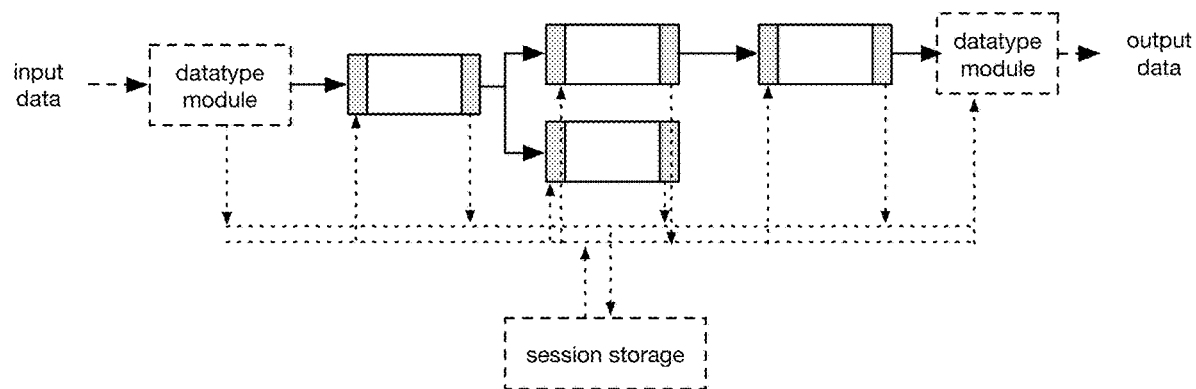
FIG. 6 depicts an example of data transfer between different components of the system.

The standardized input and MSI can be written to the session storage, wherein successive models (and/or handler thereof) can read their respective inputs from the session storage (e.g., based on a data identifier passed to the respective model; example shown in FIG. 6); alternatively, the standardized input and MSI can be directly provided to a successive (and/or handler thereof).

5.5 Executing the Model Using the MSI Input S500.

Executing the model using the MSI input S500 functions to execute the primary model using the provided input to generate an output (e.g., predict an output based on the input using the model and/or primary model). The output is preferably an MS object (e.g., an MSO object, having a MS datatype, a MS format, etc.), but can alternatively be a standard object. Execution can include: training the model, performing inference using the trained model, validating the trained model, testing the trained model, and/or otherwise executing the model. S500 is preferably performed after S400 and before Shoo, but can alternatively be performed otherwise. The model can be associated with input data (e.g., MSI), output data (e.g., MSO, standardized output), metadata (e.g., model version, description), an identifier (e.g., name), and/or any other suitable attributes.

S500 can be performed by the platform (e.g., model is loaded onto the platform), separate system (e.g., model is called through API), the computing system of a third party execution system (e.g., AWS, Google Cloud, Azure, etc.), or by any other suitable system. S500 can be controlled by: the handler of the given model, a higher-level orchestrator for the model composition, and/or other component. S500 is preferably serially repeated for each successive model, but can be performed any number of times for any model.

The model can be executed using: the input data in the MSI-format, the context data (e.g., also in the MSI format, as converted by the handler or other component), hyperparameters specified by the user (e.g., received from the execution request, specified in the context, etc.), and/or other input data or model configurations.

In variants, S500 can include loading the model and calling the model execution function (e.g., calling the predict function, calling a training loop, calling an inference function, etc.) with the MSI. The model can be called locally (e.g., on the platform), remotely (e.g., API), or otherwise be called. The model can be identified using a model identifier (e.g., filepath, URI, model name, pointer). The MSI can be retrieved (e.g., by the model), passed into the model, and/or otherwise provided to the model. The MSI can be passed as: the MSI data values, an identifier for the MSI (e.g., filepath, pointer, URI, etc.), and/or in any other suitable format.

However, the models can be otherwise executed.

5.6 Converting the Output from a MSO Object to the Standard Object S600.

Converting the output from a MSO object to a standard object Shoo functions to convert the model's output back into the universal representation (e.g., the standard object in the standard format) and/or a standardized object, such that the successive model in the model composition can use the model's output (e.g., wherein the successive model's preprocessor is configured to convert the universal representation and/or standard object to the successive model's MSI object). S600 is preferably performed after S500 and before S700 (e.g., for each model in the model composition and/or model subset), but can alternatively be performed before, after, concurrently with any other step. S600 can be executed on the same computing system as the model, or executed on a different computing system.

S600 is preferably performed similar to S400 but in reverse, but can be otherwise performed. The standardized output object that the MSO object is converted to is preferably the same object type as the standardized input object that was converted to the MSI object (e.g., sharing the same datatype, sharing the same format, etc.), but can alternatively be a different output object. For example, both the standardized input object and the standardized output object can be tensors (e.g., FlashTensors, GridTensors, etc.). In another example, the standardized input object can be a standard image, and the standardized output object can be a standard tensor. However, the standardized input object and the standardized output object can be otherwise related.

S600 is preferably performed by the handler of each model (e.g., the postprocessor of the handler), but can alternatively be performed by an upstream handler or any other suitable component. S600 is preferably performed for each model within the model composition (e.g., after respective model execution), but can be performed any other suitable number of times. The MSO format is preferably specified by the model and the handler, but can alternatively specified by the author, or otherwise determined.

In a first variant, the postprocessor of the handler is configured to convert one or more of the model outputs (e.g., from one or more of the respective model's output heads) to any one of a predetermined set of standard objects. In this variant, each standard object is associated with a different postprocessor module; alternatively, a single postprocessor module can be configured to convert the model output to one or more of a set of standard objects. In the former embodiment, the postprocessor module associated with the next model's input attributes (e.g., next model's input format, next model's inpiut datatype, etc.) can be selected; alternatively other postprocessor modules can be used. In a second variant, the postprocessor of the handler is customized to convert the model's output to the successive model's input, wherein the model's postprocessor is adjusted or specifically written for this conversion.

In a first example, S600 can include transforming the shape of the MSO to a standard-formatted shape (e.g., padding, concatenating, compressing, sampling, removing, etc.), and/or composing one or more MSI into a complex or less complex standardized input.

In a second example, S600 can include validating that the model inputs and outputs are compatible with the model and verifying that the model parameters required by the model are received.

In a third example, S600 can include introspecting the resultant MS object (e.g., from S500) to ensure that the MS object is compatible with the handler's postprocessor input requirements and/or the next model. This can include verifying that the MS object: has the handler-specified parameters, meets the handler-specified dimensions, and/or otherwise satisfies handler requirements.

S600 can include determining which MSO characteristics (e.g., shape, MS format type) to transform to the standard object and/or how to transform the MSO to the standard object. In a first variant, determining MSO characteristics can include determining the MSO characteristics from the previous model output (e.g., of a prior iteration). In a second variant, determining MSO characteristics can include determining the MSO characteristics from data received by the postprocessor. In a third variant, determining MSO characteristics can include predetermining the transformations before model execution. In a fourth variant, determining MSO characteristics can include dynamically determining the transformations during model execution. However, the MSO characteristics and/or transforms can be otherwise determined. Determining the transformations can include calculating, selecting, padding, concatenating, or otherwise determined based on MSO metadata.

The standardized output and MSO can be written to the session storage, wherein successive models (and/or handler thereof) can read their respective inputs from the session storage (e.g., based on a data identifier passed to the respective model; example shown in FIG. 6); alternatively, the standardized output and MSO can be directly provided to a successive (and/or handler thereof).

5.7 Optionally Repeating S400-S600 for Each Successive Model S700.

Repeating S400-S600 for each successive model S700 functions to repeat portions of the method for successive models within the series of different models. S700 can be tracked by the platform, a third party execution system, and/or any other suitable computing system.

For example, the platform can track the model composition execution state (e.g., which model has been executed, which model is to be executed next, which portions of the model composition have been executed, etc.), track the model execution state (e.g., completed, failed, etc.), track the model inputs and outputs, and/or track other metrics. In this example, the platform can optionally coordinate subsequent model execution (e.g., by determining that all information needed to call a model is available, by calling the next model, by passing the standardized output from a prior model to the next model, etc.), and/or perform other functionalities. However, S700 can be otherwise performed.

S700 preferably includes using the standardized output from S600 for a prior model as the standardized input for a different model (e.g., in a subsequent instance of S400 for the different model). Alternatively, the MSO can be directly provided to the next model, wherein the next model can directly use the MSO as its input in a subsequent instance of S500, or execute a subsequent instance of S300 to convert the MSO to a standard object, then to the next model's MSI before subsequent S500 instance execution. S700 preferably includes using the previous model's output as the next model's input, wherein the next model is a child model of the previous model, but can alternatively include not using the previous model's output as the current model's input.

S700 is preferably performed after S600, but can alternatively be performed before S600. S700 for a specific model can be performed in parallel, in series, and/or any other suitable temporal relationship with S700 for a different model within the model composition. S700 can be repeated one time, multiple times, and/or any other suitable number of times, or can be alternatively not be repeated.

S700 can be used in variants of the method executing the model composition with a series of different models and/or otherwise used.

Figure 9:
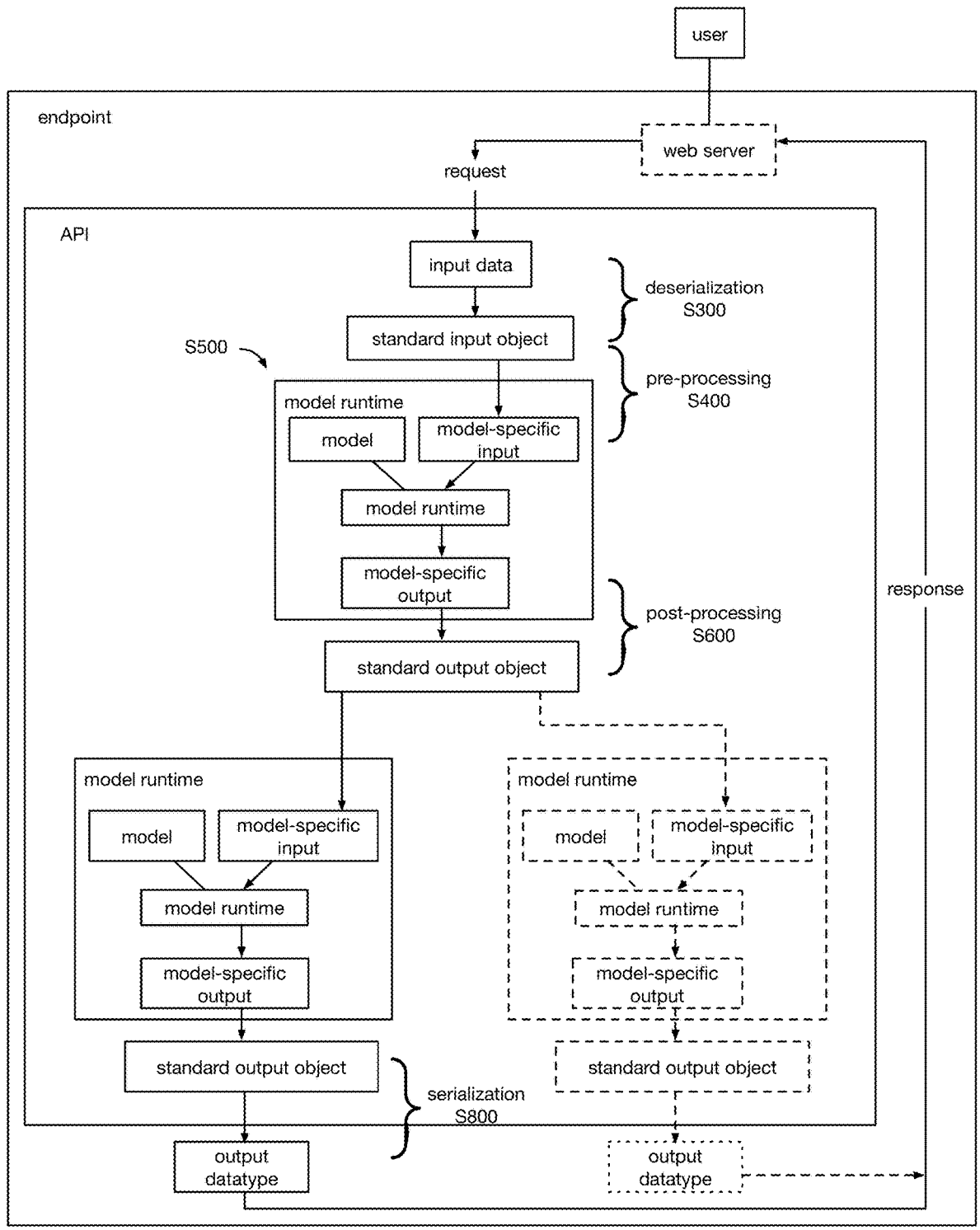
FIG. 9 is a first illustrative example of model composition execution.
Figure 10:
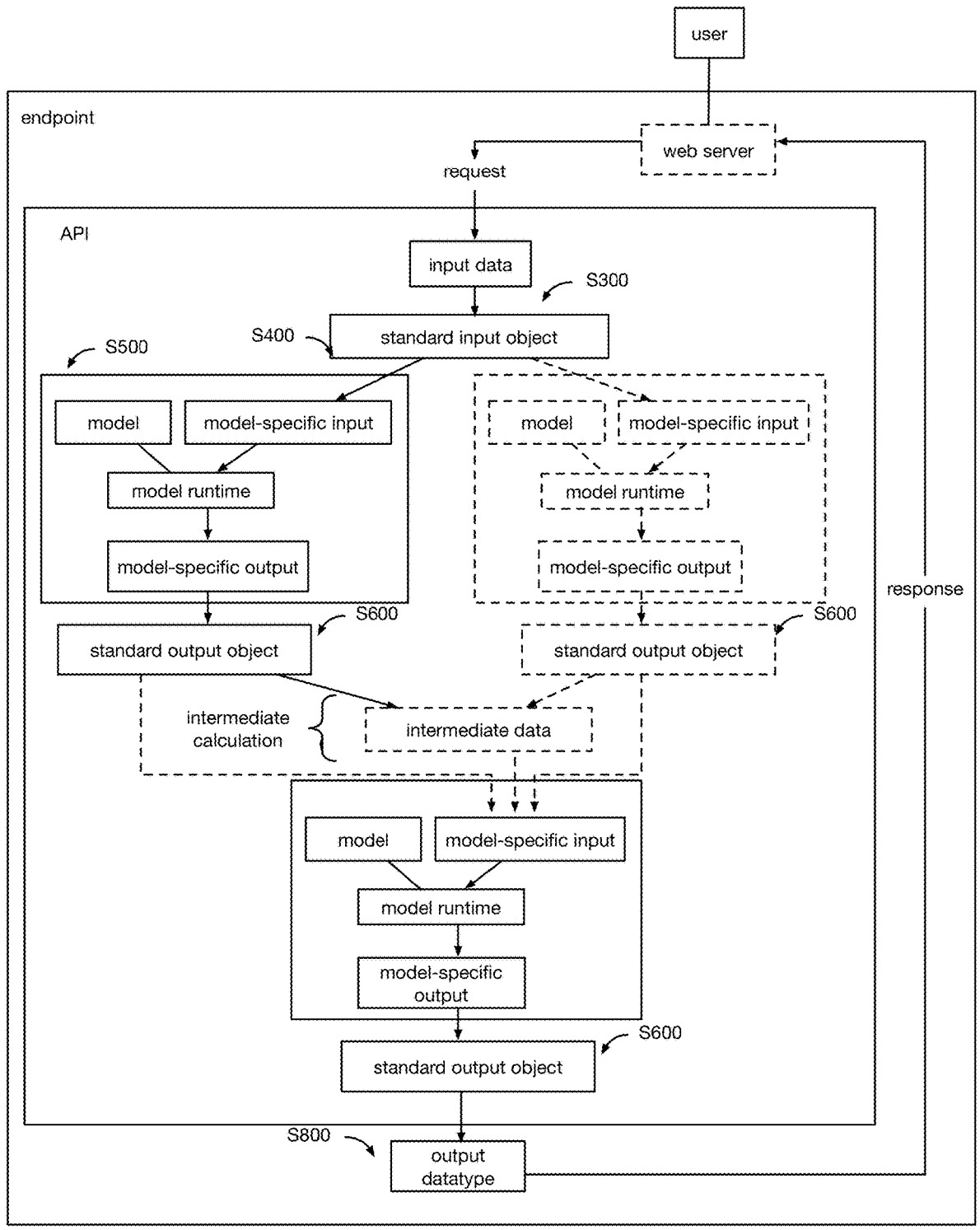
FIG. 10 is a second illustrative example of model composition execution.
Figure 11:
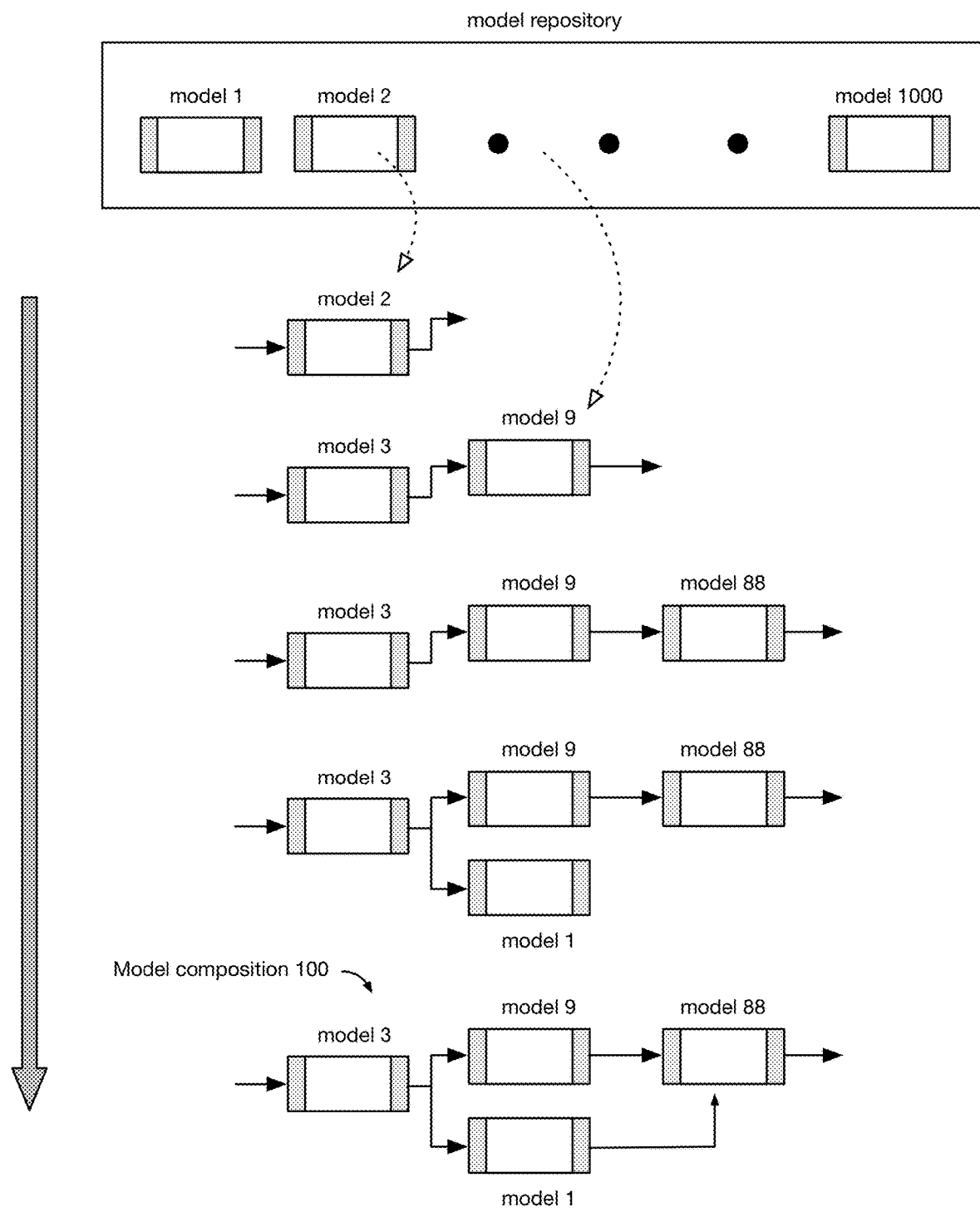
FIG. 11 depicts an example of model composition determination.

In variations, S700 can include performing S100-S600 for at least one parent model, determining the parent model's child model (e.g., next model) based on the model composition (e.g., the model receiving the parent model's output as its input), repeating S400-S600 for each successive model, and performing S800 for the output of the terminal model, wherein the outputs of the parent models are used as the inputs to the successive models; examples shown in FIG. 9 and FIG. 10. In this variation, information communication between models of the model composition is preferably a standard object (e.g., in the standard format; standard objects representing the information), but can alternatively be in another format.

However, any other suitable portion of the method can be repeated for each successive model specified in the model composition.

5.8 Optionally Converting the Standardized Output to an Output Object S800.

Converting the standardized output to an output object S800 functions to provide the output information in a transmissible, a human-readable, or otherwise expected format (e.g., single bitstreams to parallel bitstreams). S800 can be performed on: the platform, a third party execution system, and/or any other suitable computing system. In an example, S800 can include converting the output, represented as a tensor (e.g., standardized output), to an image (e.g., output datatype). In another example, S800 can include serializing the output of the terminal model to a bitstream.

S800 can be performed when the standardized output from the terminal model does not match a requested output object, but can alternatively be always performed, performed for specific model composition outputs, performed for specific endpoints, and/or otherwise performed. The requested output object (e.g., attributes thereof, such as datatype, forma, shape, etc.) can be specified by: a user (e.g., in the request), the endpoint receiving the output data (e.g., determined from an API specification, etc.), determined based on the input object (e.g., received from the datasource), and/or otherwise determined.

S800 can include converting the standardized output from the terminal model to an object having output object attributes (e.g., datatype, data format, shape, etc.). The terminal model can be: the last model (e.g., leaf model) within the model composition, the last model within a model subset, a selected model within the model composition, and/or any other suitable model. The output can be specified by the user, automatically determined (e.g., previous model's specification, current model's specification), and/or otherwise specified.

The output object preferably has a standard datatype, but can alternatively be nonstandard (e.g., wherein the model composition can include a nonstandard data module to convert the standardized output from the standard datatype to the nonstandard datatype). The output datatype can be: a datatype specified by the user (e.g., in the execution request), automatically determined (e.g., for the parent model, for the child model, etc.), or otherwise determined. For example, the output datatype can be automatically determined: from the parent model's specification (e.g., from the datatype of the returned value), from the child model's specification (e.g., from the datatype of the child model's input), and/or otherwise determined.

The output object preferably has a standard format, but can alternatively be nonstandard (e.g., wherein the model composition can include a nonstandard data module to convert the standardized output from the standard format to the nonstandard format). The output format can be: a format specified by the user (e.g., in the execution request), automatically determined (e.g., for the parent model, for the child model, etc.), or otherwise determined. For example, the output format can be automatically determined: from the parent model's specification (e.g., from the format of the returned value), from the child model's specification (e.g., from the format of the child model's input), and/or otherwise determined.

S800 is preferably performed by the data module for the output datatype, but can be performed by the handler of the terminal model or by another component. S800 is preferably performed once for each model composition output (and/or model subset output), but can alternatively be performed after execution of each model, or otherwise performed. In a first example, S800 is performed after the terminal model has executed. In a second example, S800 is performed after each model's execution, wherein the model output is converted from the previous model's MSO to a standard object to the output object, then converted from the output object to the standard object to the current model's MSI object. In a third example, S800 is performed after each model's execution, wherein the model's MS output object is converted to a standard object, serialized, optionally sent to the next model (e.g., via the platform, wherein the platform routes and/or stores the data), deserialized (e.g., by the next model) into the standard object, and converted to an MS input object for the next model before next model execution.

However, S800 can be performed any number of times at any suitable point in the method. The conversion is preferably lossless, but can alternatively be lossy. S800 preferably includes serializing the output data, but the conversion can be otherwise performed.

5.9 Optionally Providing a Final Model Output to an Endpoint S900.

Providing a final model output to an endpoint S900 functions to return the output to the user or entity executing the model composition. The output (e.g., model composition output, terminal model output) is preferably represented as an output object, but can additionally or alternatively be represented in as a standard object and/or otherwise represented. In examples, S900 can include presenting the final model output as an image on the interface, writing the output as a tensor to a database, and/or sending the output to an API (e.g., as part of a function call).

5.10 Optionally Training Models in the Model Composition.

The method can optionally include training models in the model composition, which functions to generate trained models within the model composition.

In a first variant, this can include training the entire model composition, wherein S200-S900 and/or portions thereof is performed for each piece of training data.

In a second variant, this can include individually training each model within the model composition, wherein different training data is used (e.g., different set of training inputs and targets for each stage of the model composition)

In a third variant, this can include training model subsets within the model composition.

However, the models in the model composition can be otherwise trained.

Different processes and/or elements discussed above can be performed and controlled by the same or different entities. In the latter variants, different subsystems can communicate via: APIs (e.g., using API requests and responses, API keys, etc.), requests, and/or other communication channels.

6. Examples

In a first example, the method can include: deserializing input data; optionally converting the input data into a standard object (e.g., generating a standardized input); and passing the standardized input into a model within a model composition, wherein the model and/or modules thereof converts the standardized input into a model-specific object (e.g., generating a model-specific input (MSI)), executes using the MSI to generate a model-specific output (MSO), and converts the MSO to a standard object (e.g., generates a standardized output from the MSO). The standardized output is then passed to a child model within the model composition as the child model's input, wherein the child model repeats the method described above. When a child model is dependent upon multiple parent models, the parent models can be executed concurrently and/or child model execution can be paused until all input data is available. When the series of models within the model composition is exhausted (e.g., a terminal model has executed), the model composition output (e.g., the output of the terminal model(s)) can be serialized and transmitted to a specified endpoint.

Figure 3:
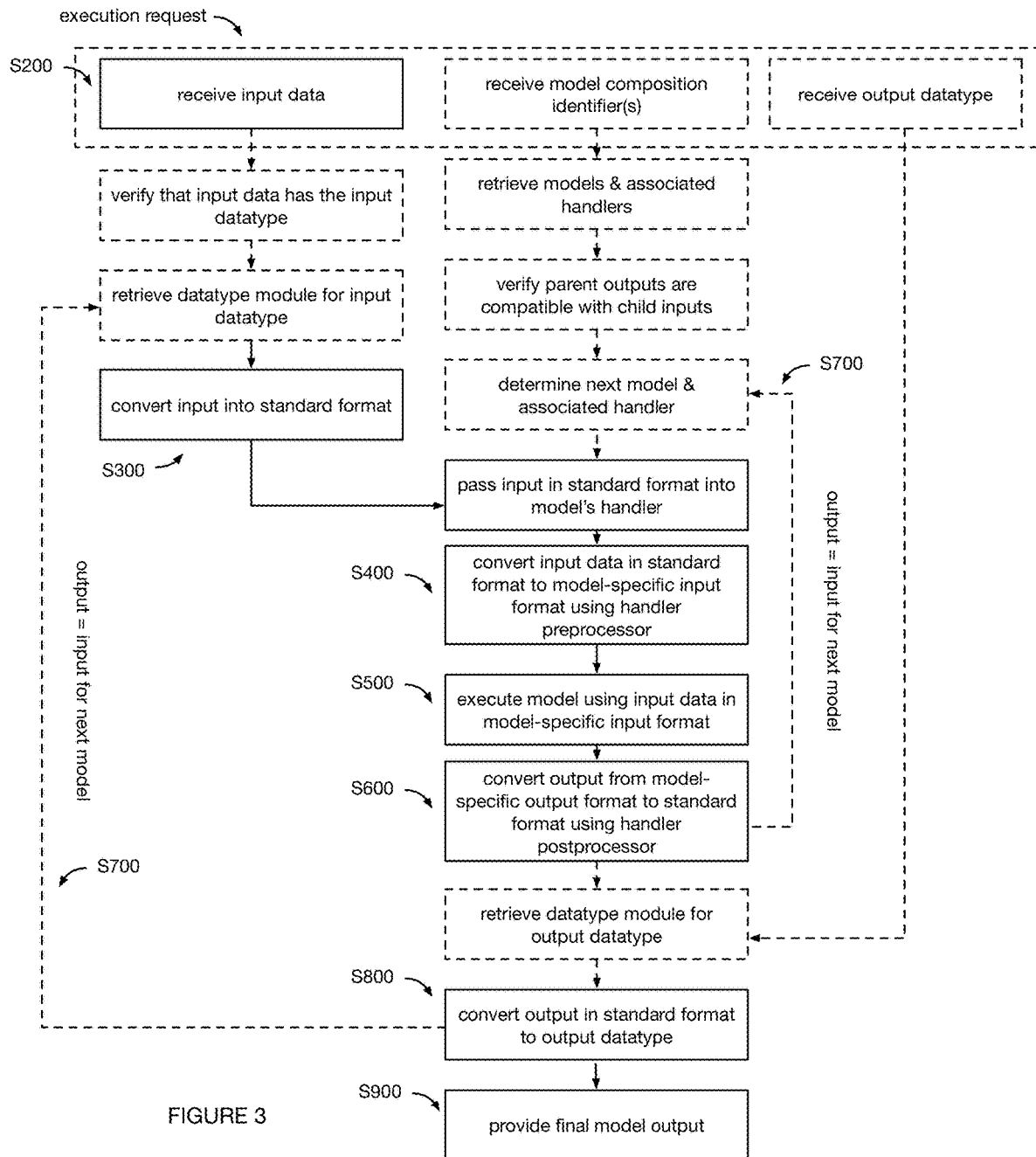
FIG. 3 depicts an example of the method.

In an illustrative example (e.g., shown in FIG. 3), the method includes: receiving an execution configuration including an input identifier (e.g., pointer, URL, etc.), a standardized input datatype, a model composition identifier (e.g., name, URL, etc.), and a standardized output datatype from a user. The input data is retrieved based on the input identifier and optionally verified as the standardized input datatype. A data module for the standardized input datatype is retrieved, and the input data is converted (e.g., deserialized) into a standard format (e.g., a FlashTensor object). The model composition is retrieved based on the model composition identifier, wherein the model composition can define a tree (e.g., directed acyclic graph) of connected models, each associated with a model-specific handler. The method can optionally include verifying that the outputs of parent models are compatible as the inputs of child models (e.g., have the same datatype). The standardized input data is then passed to the handler of the first model in the model composition, wherein the handler converts the standardized input data into a model-specific input format (MSI format) for the model. The model is then executed using the MSI-formatted input data (e.g., performs inference using the MSI-formatted input data; trained using the MSI-formatted input data; etc.), wherein the model generates an output in a model-specific output format (MSO format). The model's handler can then convert the MSO-formatted output into the standard format (e.g., FlashTensor). The standardized output can then be passed as a standardized input to the handler of a child of the first model, wherein the method is repeated by the child model's handler and the child model until a terminal model is executed. The terminal model's standardized output is then converted to (and output as) the standardized output datatype specified by the execution configuration, using a data module for the standardized output datatype (e.g., serialized). In a specific example, the input data can be JSON encoded data, wherein the input data module encodes the input data objects into a set of proprietary objects and the output data module encodes the proprietary objects into an output datatype.

In a second example (examples shown in FIG. 13 and FIG. 14), the method can include receiving a selection of an output from a model, identifying a path within the model composition between a root model and the model associated with the selected output, wherein the path includes a subset of the models within the model composition (e.g., a model subset), performing S400-S700 using the model subset (e.g., executing the model subset; performing inference using the model subset; predicting using the model subset, etc.), and outputting the values of the selected model output.

In a third example, the method can be similar to the second variant, but additionally include identifying layers within each model in the model subset (e.g., model layer subset) that contribute to selected output generation. In this variant, S400-S700 can be performed using the model layer subset (e.g., using only the model layer subset), and outputting the selected model output.

When information or data is stored or transferred, the information or data can be: cleartext, hashes, in an encrypted format (e.g., encrypted with a key associated with the SYSTEMS, etc.), signed (e.g., with a verification key associated with the SYSTEMS, etc.), and/or otherwise transmitted. The sending systems can be authenticated, authorized, or otherwise verified by the receiving systems before establishing a communication channel (e.g., using credentials, tokens, passwords, or other authentication or authorization mechanisms); alternatively, the sending systems can be unauthorized or unauthenticated.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions, that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

One or more variations of the system and/or method can omit one or more of the above elements and/or include a plurality of one or more of the above elements in any suitable order or arrangement.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method comprising:
    determining a set of connected heterogeneous models comprising a parent model and a set of child models, wherein the heterogeneous models are connected in a directed acyclic graph, wherein each model is represented as a subgraph within the directed acyclic graph, wherein each node of each subgraph is associated with a model layer;
    receiving a selection of an output from a child model of the set;
    identifying a path within the directed acyclic graph between the parent model and the child model, the path comprising the model layers of a subset of models between the parent model and the selected output;
receiving an input;
for each successive model in the subset of models:
  a) converting the input into a standard format;
  b) converting the standard-formatted input into a model-specific input (MSI) format for the respective model;
  c) executing the model within the set of models using the MSI-formatted input data to generate an output in a model-specific output (MSO) format for the respective model;
  d) converting the output from the MSO format to the standard format; and
wherein a)-d) are repeated for each successive child model of the subset of models, using the standard-formatted output from a prior model as the standard-formatted input data for the child model, wherein a)-d) are only performed using the identified model layers of the models of the subset; and
converting the standard-formatted output of the selected child model to an output datatype.

2. The method of claim 1, further comprising:
converting the standard-formatted output for a model from the set to an output datatype; and
providing the output datatype as a final model output.

3. The method of claim 1, wherein the set of heterogeneous models are each authored by different entities.

4. The method of claim 1, wherein the set of models comprise at least one of neural network models, regression models, or ruleset models.

5. The method of claim 1, wherein the standard format is a tensor.

6. The method of claim 1, wherein the MSO format of the parent model is incompatible with an MSI format of a child model.

7. The method of claim 1, wherein the selected output is an output variable, wherein the input is an input value, and wherein a)-d) are performed using input values and output values.

8. A heterogeneous model composition system, comprising:
a non-transitory computer readable medium; and
a processor coupled to the non-transitory computer readable medium, the processor configured to:
  determine a model composition, comprising a series of heterogeneous models connected by inputs and outputs, wherein each model is associated with a handler configured to convert an input for the model from a standard object to a model-specific input (MSI) object and convert a set of outputs of the model from a model-specific output (MSO) object to the standard object, wherein the series of heterogeneous models cooperatively form a directed acyclic graph;
  present the outputs of the models of the model composition to a user;
  receive a selection of an output from an intermediary model of the series;
  determine a subset of models connecting a root model of the model composition to the intermediary model and a subset of model layers connecting the root model to the selected output of the intermediary model;
  facilitate execution of the model composition, wherein only the subset of models and the subset of layers are executed, wherein model composition execution comprises:
    converting input data into a standard input object;
    for each successive model:
      converting the standard input object into the respective MSI object using the respective handler;
      executing the model using the MSI object to generate a set of MSO objects; and
      converting the set MSO objects to standard output objects using the respective handler; and
    providing the standard output object from the selected intermediary model to an endpoint.

9. The system of claim 8, wherein model composition execution further comprises converting the standard output object for a model to an output datatype.

10. The system of claim 8, wherein determining the series of heterogeneous models comprises receiving an identifier for each model within the series and the connections between the inputs and the outputs from a user at a user interface.

11. The system of claim 8, wherein each model within the series is authored by a different entity.

12. The system of claim 11, wherein the series of heterogeneous models are stored in a model repository, and wherein the processor is further configured to access the model repository and execute the model composition.

13. The system of claim 8, wherein the series of models comprises at least one of neural network models, regression models, or ruleset models.

14. The system of claim 8, wherein the standard object is a tensor.

15. The system of claim 8, wherein the MSO object of a preceding model in the series is incompatible with an MSI object of a succeeding model in the series.

16. The system of claim 8, wherein the models are executed in a different computing environment from the processor, wherein facilitating execution of the model composition comprises, for each successive model in the series: sending an output identifier for the standard output object, output by a preceding model, to the computing environment in association with a model identifier for the successive model, wherein the successive model uses the output identifier to access the standard output object.

* * * * *